United States Patent [19]
Yoshimura

[11] Patent Number: 5,158,052
[45] Date of Patent: Oct. 27, 1992

[54] ALUMINUM ALLOY PISTON

[75] Inventor: Hideo Yoshimura, Kanagawa, Japan

[73] Assignee: Atsugi Unisia Corporation, Kanagawa, Japan

[21] Appl. No.: 839,582

[22] Filed: Feb. 21, 1992

[30] Foreign Application Priority Data

Feb. 28, 1991 [JP] Japan ................... 3-10256[U]

[51] Int. Cl.$^5$ ............................................. F02F 3/00
[52] U.S. Cl. .................... 123/193.6; 92/223; 92/224
[58] Field of Search ............ 123/193.6, 668, 669; 92/212, 213, 222, 223, 224

[56] References Cited

U.S. PATENT DOCUMENTS

| | | | |
|---|---|---|---|
| 1,386,766 | 8/1921 | Centervall | 92/223 |
| 2,297,460 | 9/1942 | Dietrich | 123/193.6 |
| 3,735,746 | 5/1973 | Schieber | 123/193.6 |
| 3,911,891 | 10/1975 | Dowell | 92/223 |
| 4,798,770 | 1/1989 | Donomoto et al. | 123/193.6 |
| 4,909,133 | 3/1990 | Taylor et al. | 92/222 |
| 4,955,353 | 9/1990 | Amataka et al. | 123/668 |

*Primary Examiner*—E. Rollins Cross
*Assistant Examiner*—M. Macy
*Attorney, Agent, or Firm*—Bachman & LaPointe

[57] ABSTRACT

An abrasion and scuff resistant piston comprises a piston main body of aluminum alloy, a ring groove for retaining a piston ring, an abrasion resistant nickel plate layer covering at least the ring groove, a piston skirt, also of aluminum alloy and an abrasion resistant steel plate layer covering the lower outer circumference of the piston including the piston skirt.

10 Claims, 2 Drawing Sheets

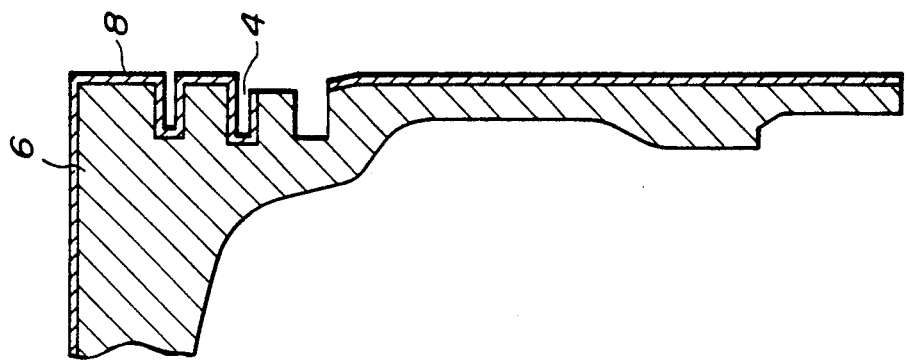
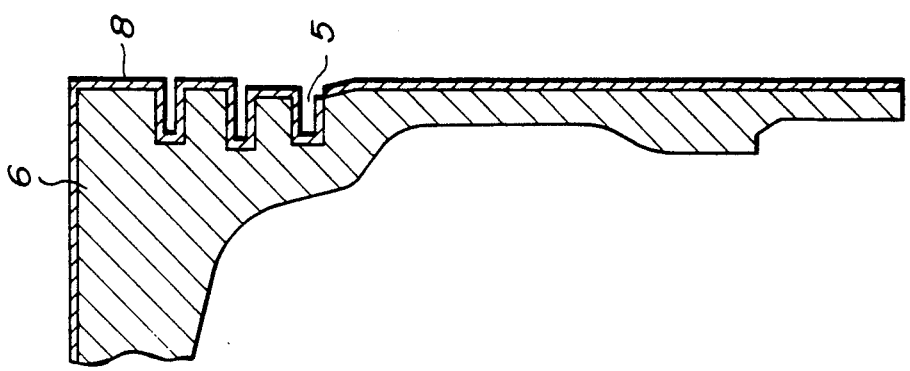
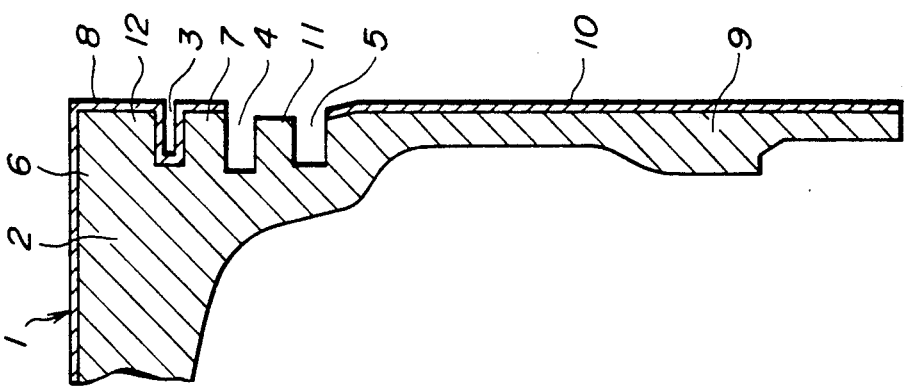

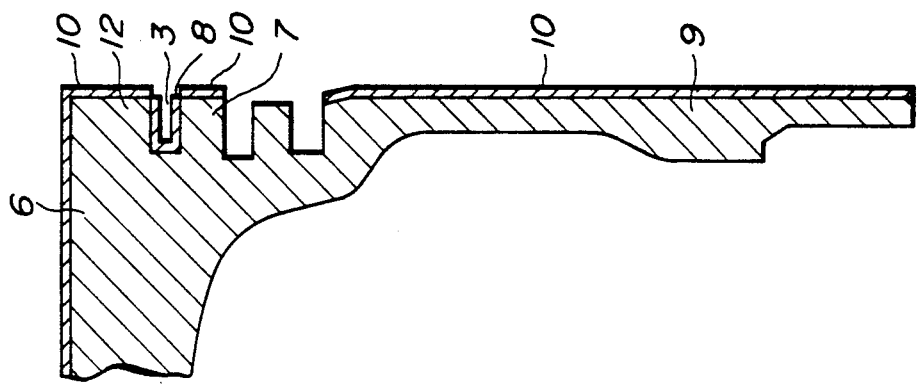
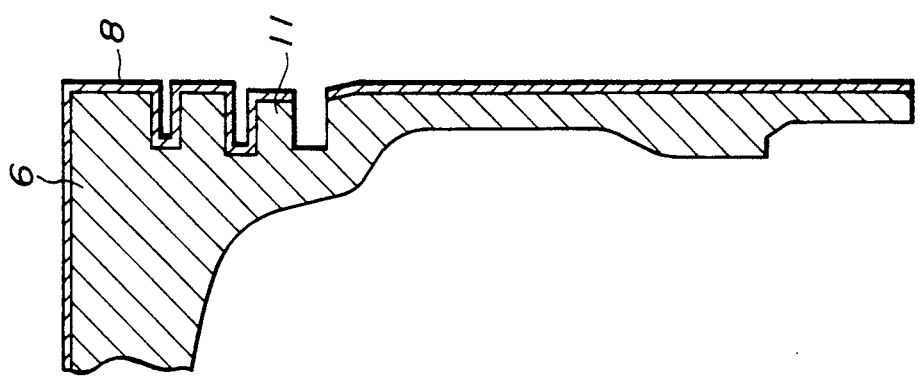

ALUMINUM ALLOY PISTON

BACKGROUND OF THE INVENTION

1. Field of the Invention

The present invention relates generally to a piston for an internal combustion engine. Particularly, the invention relates to a piston made of aluminum alloy.

2. Description of The Prior Art

In modern automotive products engines are manufactured which run at high revolution speeds. For this reason cylinder blocks, or cylinder liners of aluminum alloy are widely used for their lightweight characteristics. Aluminum alloy is also a preferred material for pistons, however, an aluminum piston disposed in an an aluminum cylinder block incurs a high degree of abrasion, and/or scuffing of the piston head and skirt due to the rubbing contact of to components of the same material. For this reason, manufacturers seek so increase the abrasion resistance of aluminum pistons by including an anti-abrasion layer of another material such as alumite.

One such piston is exemplified by Japanese Patent Application First Publication 63-289370 in which an alumite layer is provided around a first piston ring groove and/or a piston skirt. However, this procedure does not fully satisfy the anti-abrasion requirements for modern high speed engines, therefore, a further improved abrasion and scuff resistant piston construction has been required.

SUMMARY OF THE INVENTION

It is therefore a principal object of the present invention to provide an abrasion and scuff resistant piston for an internal combustion engine.

It is a further object of the present invention to provide an abrasion and scuff resistant piston which is light in weight and may operate reliably at high engine speeds.

In order to accomplish the aforementioned and other objects, a piston is provided, comprising: a piston body including a piston head, first a circumferential groove for retaining a piston ring and a first land portion extending circumferentially between the piston head and the circumferential groove; a skirt portion formed at a lower end of the piston body; a first protective layer of a first material covering at least the groove; and a second protective layer of a second material covering at least the skirt portion.

BRIEF DESCRIPTION OF THE DRAWINGS

FIG. 1 shows a cross-sectional view of the aluminum alloy piston of the invention;

FIG. 2 is a cross-sectional view of a second embodiment of the piston;

FIG. 3 is a cross-sectional view of a third embodiment of the piston;

FIG. 4 is a cross-sectional view of a fourth embodiment of the piston;

FIG. 5 is a cross-sectional view of a fifth embodiment of the piston;

DESCRIPTION OF THE PREFERRED EMBODIMENT

Referring now to the drawings, particularly to FIG. 1, a piston 1 comprises a piston body 2 of aluminum alloy, for example, including a first ring groove 3, a second ring groove 4, and an oil ring groove 5 formed therein. The piston body 2 further includes a first land 12 between a piston head 6 and the first ring groove 3, a second land 7 between the first and second ring grooves 3 and 4, and a cylinder head 6. As seen in FIG. 1, an outer surface of the piston body 2, from the cylinder head 6 to the lower edge of the land 7, is covered by a nickel plate layer 8. Further, at a lower portion of the piston body 2, a piston skirt 9 is formed. The piston skirt 9 is covered by a steel plate layer 10 on an outer surface thereof, from the top edge meeting a lower surface of the oil ring groove 5 to a bottom of the skirt portion.

It will be noted in relation to the above that, since significant occurrence of adhesion with respect to the second ring groove and the oil ring groove was not observed, the nickel plating procedure was not applied to these areas. In addition, a third land 11, between the second ring groove and the oil ring groove was also not subjected to nickel plating.

Further, is will be noted that the nickel plating provided is sufficient to effectively stop ring adhesion of the piston ring (not shown in the drawings) installed in the plated ring groove 3 and further, abrasion of the groove due to wear is significantly reduced. In addition, the nickel plating over the first and second lands 12 and 7, in addition to the ring groove 3 and the piston head 6, significantly improves the heat resistance characteristics of the piston.

With respect to scuff resistance, since scuffing affects the skirt portion 9 of the piston 1, the steel plating layer 10 is provided to suitably prevent such scuffing of the piston skirt 9.

Now referring to FIGS. 2–5, the second to fifth embodiments of a piston according to the present invention will be explained.

In FIG. 2 it can be seen that the nickel plating layer 8 may be extended to cover the first and second ring grooves 3 and 4, the oil ring groove 5 as well as the three lands 12, 7 and 11, the nickel plating layer 8 and the steel plating layer 10 bordering each other at a bottom edge of the oil ring groove. According to this arrangement a greater degree of abrasion and heat resistance may be obtained.

Referring to FIG. 3, the nickel plating layer 8 is extended only as far as the bottom of the second ring groove. In FIG. 4 the nickel plating is further extended to include the third land 11. Both of the above embodiments offer increased abrasion and heat resistance as in the first and second embodiments.

FIG. 5 shows a fifth embodiment of a piston according to the present invention. In the drawing it can be seen that the nickel plating layer extends over the piston head 6, the first land 7 to the bottom of the first ring groove similarly to the first embodiment. In the present embodiment however, the second land 7 is applied a steel plating layer 10 the same as applied to the skirt portion 9. This provides improved abrasion, adhesion and heat resisting qualities as in the previous embodiments and offers extra abrasion resistance at the second land 7.

Thus, according to the present invention, suitable resistance to abrasion, ring adhesion and heat may be obtained for a wide variety of piston applications and engine types.

While the present invention has been disclosed in terms of the preferred embodiment in order to facilitate better understanding thereof, it should be appreciated that the invention can be embodied in various ways without departing from the principle of the invention.

Therefore, the invention should be understood to include all possible embodiments and modification to the shown embodiments which can be embodied without departing from the principle of the invention as set forth in the appended claims.

What is claimed is:

1. A piston comprising:
   a piston body including a piston head, first a circumferential groove for retaining a piston ring and a first land portion extending circumferentially between said piston head and said circumferential groove;
   a skirt portion formed at a lower end of the piston body;
   a first protective layer of a first material covering at least said groove; and
   a second protective layer of a second material covering at least said skirt portion.

2. A piston as set forth in claim 1, wherein said piston body, piston head, and said skirt portion are formed of aluminum alloy.

3. A piston as set forth in claim 1, wherein said first material is nickel and said second material is steel.

4. A piston as set forth in claim 1, wherein said piston body further includes a second circumferential groove, a third circumferential groove, a second land portion extend circumferentially between said first circumferential groove and said second circumferential groove and a third land extending circumferentially between said second circumferential groove and said third circumferential groove.

5. A piston as set forth in claim 1, wherein said first protective layer additionally covers said piston head and said first land portion.

6. A piston as set forth in claim 4, wherein said first protective layer additionally covers said piston head, said first land portion, said second land portion and said second circumferential groove.

7. A piston as set forth in claim 6, wherein said first protective layer additionally covers said third land portion.

8. A piston as set forth in claim 7, wherein said first protective layer additionally covers said third circumferential groove.

9. A piston as set forth in claim 4, wherein said first protective layer additionally covers said piston head, said first land portion.

10. A piston as set forth in claim 9, wherein said second protective layer additionally covers said second land portion.

* * * * *